(12) United States Patent
Tsai et al.

(10) Patent No.: US 8,313,349 B2
(45) Date of Patent: Nov. 20, 2012

(54) MULTI-SLOT CONNECTOR

(75) Inventors: Chia-Chang Tsai, Hsin-Chu (TW); Chih-Kang Wu, Hsin-Chu (TW); Chun-Ta Wu, Hsin-Chu (TW)

(73) Assignee: Au Optronics Corporation, Hsin-chu (TW)

( * ) Notice: Subject to any disclaimer, the term of this patent is extended or adjusted under 35 U.S.C. 154(b) by 0 days.

(21) Appl. No.: 13/241,486

(22) Filed: Sep. 23, 2011

(65) Prior Publication Data

US 2012/0015562 A1    Jan. 19, 2012

Related U.S. Application Data

(62) Division of application No. 12/533,612, filed on Jul. 31, 2009, now Pat. No. 8,043,120.

(30) Foreign Application Priority Data

Sep. 5, 2008  (TW) .............................. 97134305 A (51) Int. Cl.
    *H01R 24/00* (2006.01)
(52) U.S. Cl. ...................................... 439/629
(58) Field of Classification Search .................... 439/59, 439/61, 65, 629, 951
    See application file for complete search history.

(56) References Cited

U.S. PATENT DOCUMENTS

| | | | |
|---|---|---|---|
| 3,351,891 A | 11/1967 | Schneck | |
| 3,466,591 A | 9/1969 | Edoardo | |
| 3,697,926 A | 10/1972 | Krafthefer | |
| 3,706,954 A | 12/1972 | Krafthefer | |
| 4,150,863 A | 4/1979 | Krafthefer et al. | |
| 4,220,382 A | 9/1980 | Ritchie et al. | |
| 6,238,237 B1 | 5/2001 | Nagahata et al. | |
| 8,043,120 B2 * | 10/2011 | Tsai et al. | 439/629 |
| 2007/0230169 A1 | 10/2007 | Kwon et al. | |
| 2009/0067167 A1 | 3/2009 | Cheng et al. | |
| 2010/0062651 A1 | 3/2010 | Tsai et al. | |
| 2011/0013380 A1 * | 1/2011 | Cheng et al. | 362/97.1 |
| 2012/0015562 A1 * | 1/2012 | Tsai et al. | 439/660 |

FOREIGN PATENT DOCUMENTS

JP    2007280955 A    10/2007

OTHER PUBLICATIONS

Taiwan Notice of Allowance dated May 18, 2011.
English language translation of abstract of TW M317103.
English language translation of abstract of TW M262861.
English language translation of abstract of TW M255538.
English language translation of abstract of TW 481941.

* cited by examiner

*Primary Examiner* — James Harvey
(74) *Attorney, Agent, or Firm* — McClure, Qualey & Rodack, LLP (57) ABSTRACT

A multi-slot connector and a manufacture method thereof are provided. The multi-slot connector includes a housing and a conducting structure. The conducting structure has a body and a terminal portion extending from the body. After extending out from the body, the terminal portion bends to form a first ridge. After bending the first ridge, the terminal portion turns to form a winding portion which winds back toward the body and bends to form a second ridge, wherein the first and second ridges protrude toward different directions. The housing has a first slot and a second slot. When the conducting structure is disposed in the housing, the first ridge and the second ridge are respectively corresponding to the first slot and the second slot.

3 Claims, 13 Drawing Sheets

MULTI-SLOT CONNECTOR

This is a divisional application of patent application Ser. No. 12/533,612 filed on Jul. 31, 2009, now allowed. The prior application Ser. No. 12/533,612 claims the benefit of Taiwan Patent Application No. 097134305 filed on Sep. 5, 2008, the disclosures of which are incorporated herein by reference in their entirety.

BACKGROUND OF THE INVENTION

1. Field of the Invention

This invention relates to a multi-slot connector; more particularly, this invention relates to a multi-slot connector used in a backlight module.

2. Description of the Prior Art

Backlight modules are widely applied in all kinds of products, such as LCDs, to provide light sources for products. Recently, with the increase of the demand on LCDs, the technology of backlight module has also become more mature. Take the existing backlight module in the market as an example. Because light tubes have an advantage of low cost, light tubes are still the dominant light sources employed in backlight modules.

Figure 1A:
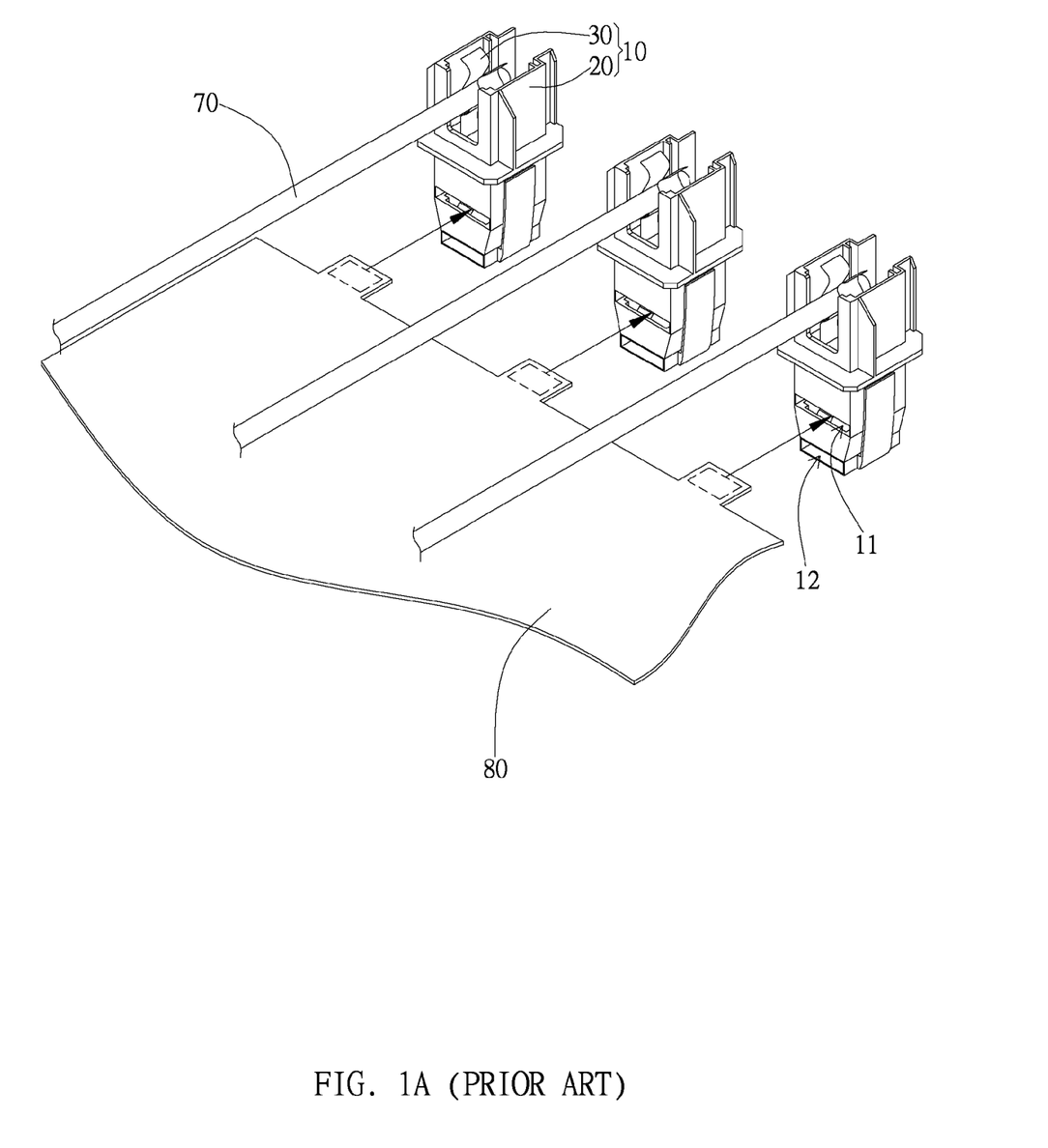
FIG. 1A schematically illustrates a conventional backlight module.
Figure 1B:
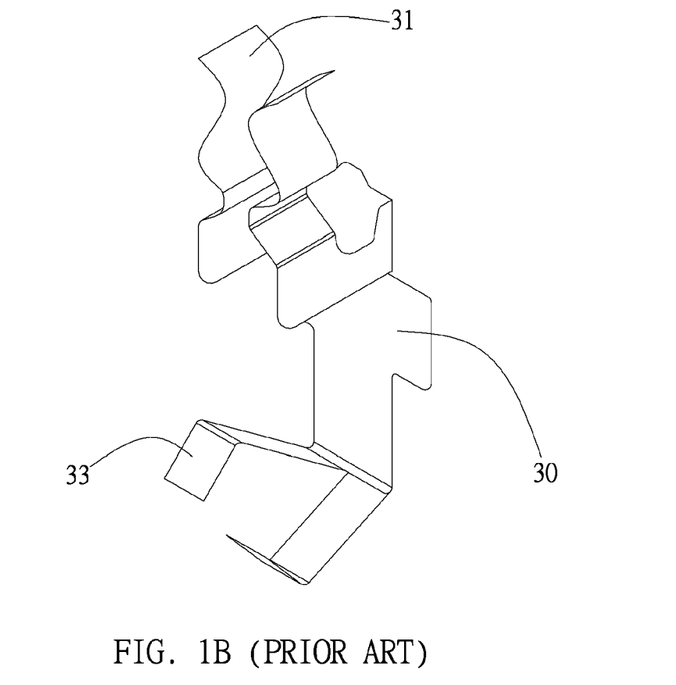
FIG. 1B schematically illustrates a conducting structure for use in a conventional light tube connection.
Figure 1C:
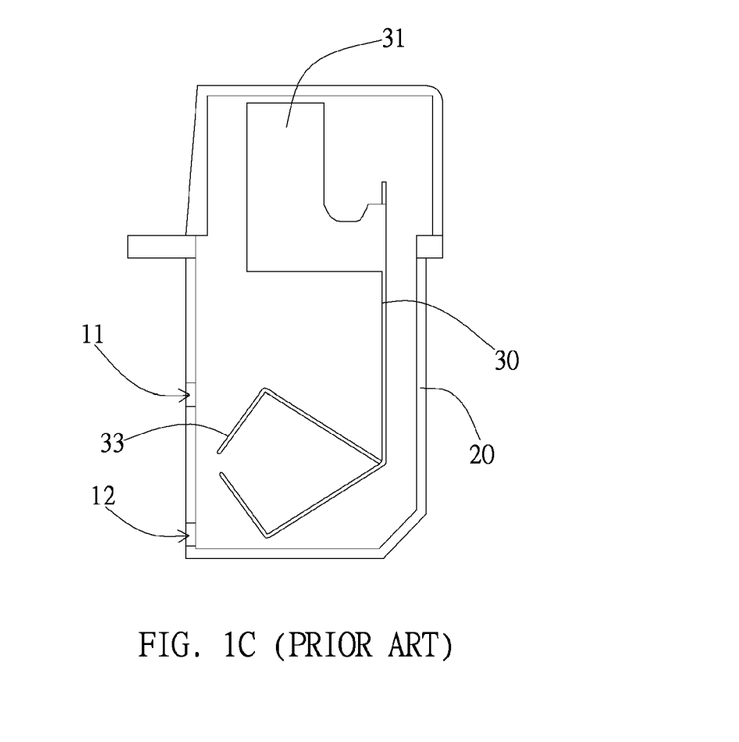
FIG. 1C schematically illustrates a cross-sectional view of a light tube and a light tube connector of a conventional backlight module.

FIG. 1A schematically illustrates an assembly view of light tubes in a conventional backlight module. The light tubes 70 are extended into multi-slot connectors 10, and the circuit device 80 providing signals or power to the light tubes 70 is inserted into the first slot 11 or the second slot 12 on the lower side of the multi-slot connector 10. As shown in FIG. 1B and FIG. 1C, the multi-slot connector 10 includes a housing 20 and a conducting structure 30. The upper end of the conducting structure 30 forms a light tube clip end 31 for clipping the electrode of the light tube 70. The lower end of the conducting structure 30 is bent to form a terminal portion 33 for coupling the conducting pad of the circuit device 80.

In the dual-slot design, the circuit device 80 can be inserted into the first slot 11 or the second slot 12, and the terminal portion 33 is divided into two parts. Moreover, one part is bent upward and the other part is bent downward to correspond to the first slot 11 and the second slot 12, respectively. Therefore, the circuit device 80 inserted into the first slot 11 or the second slot 12 can be electrically connected to only one part of the two parts of the terminal portion 33. However, because the terminal portion 33 is divided into two parts, the width of each part is also reduced to half, such that the structure stability and the conductivity of the connection between terminal portion 33 and the circuit device 80 are accordingly lowered.

SUMMARY OF THE INVENTION

An object of this invention is to provide a multi-slot connector and a manufacture method thereof, which can increase the structure stability of the connection between the multi-slot connector and the circuit device.

An object of this invention is to provide a multi-slot connector and a manufacture method thereof, which can increase the transmission stability of signals or power between the multi-slot connector and the circuit device.

The multi-slot connector includes a housing and a conducting structure, wherein the conducting structure is disposed in the housing. The conducting structure includes a body and a terminal portion, wherein the terminal portion extends from one end of the body. After the terminal portion extends out from the body, the terminal portion bends to form a first ridge. With such an arrangement, the first ridge can protrude out to form a ridge, which is flexible due to the body material thereof and the structural arrangement. After the first ridge is formed, the terminal portion turns to form a winding portion, which winds back toward the body, and then bends to form a second ridge. With this design, the second ridge protrudes out to form a ridge and is opposite to the first ridge, wherein the first ridge and second ridge can protrude in different directions, respectively.

A first slot and a second slot are formed on the housing. When the conducting structure is disposed in the housing, the first ridge and the second ridge respectively correspond to the first slot and the second slot for connecting the circuit device inserted in the first slot and the second slot, respectively.

DETAILED DESCRIPTION OF THE PREFERRED EMBODIMENT

This invention provides a multi-slot connector for use with a circuit device. In one embodiment, the multi-slot connector of this invention is applied to a backlight module for clipping a light tube to serve as a light source. However, in another embodiment, the multi-slot connector can be employed in other electronic devices to serve as the signal or power transmission medium. Moreover, the backlight module that uses the multi-slot connector of this invention can be applied to LCDs to provide the required light source for the LCD panels. When applied to LCDs, the multi-slot connector can clip a cold cathode tube or other light tubes to provide required signals and power to the light tube.

Figure 2A:
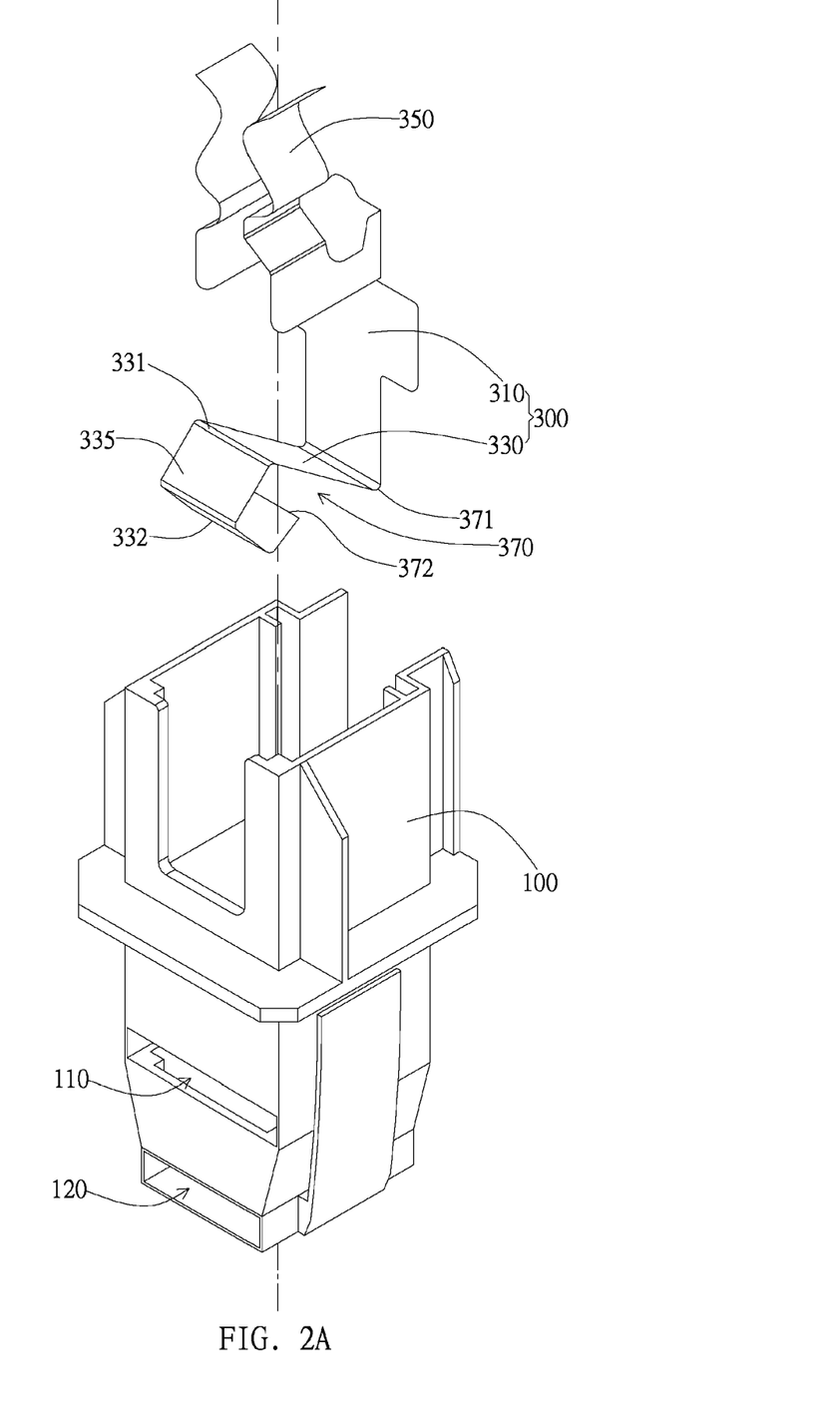
FIG. 2A is an exploded view of elements of a multi-slot connector in one embodiment of this invention.

In the embodiment shown in FIG. 2A, the multi-slot connector of this invention includes a housing 100 and a conducting structure 300. The housing 100 can be made of insulating material, such as plastics. A first slot 110 and a second slot 120 are formed on the housing 100. In this embodiment, the first slot 110 and the second slot 120 are formed on the same surface plane of the housing 100. That is, the first slot 110 and the second slot 120 face the same direction. The first slot 110 and the second slot 120 can be formed as two parallel slits; however, in another embodiment, the first slot 110 and the second slot 120 can be formed as openings of different shapes.

As shown in FIG. 2A, the conducting structure 300 can be disposed in the housing 100. The conducting structure 300 includes a body 310 and a terminal portion 330. The terminal portion 330 can extend from one end of the body 310. In this embodiment, the conducting structure 300 further includes a light tube clip end 350 connected to the other end of the body 310 opposite to the terminal portion 330; however, in another embodiment, the other end of the body 310 opposite to the terminal portion 330 can be connected to other structures. Moreover, in this embodiment, the body 310 and the terminal portion 330 can be an integrally formed conductive metal sheet, which is first punched or cut to form the body 310 and the terminal portion 330 in a flat shape. The body 310 can be formed in a T shape. The horizontal portion on the top of the body (i.e. the head of the T shape body) can be fixed in the housing 110, and the vertical portion at the bottom (i.e. the tail of the T shape body) can be used to connect the terminal portion 330. Then, the terminal portion 330 is bent with respect to the body 310 to complete the formation of the body 310 and the terminal portion 330. In one embodiment, the metal sheet used to form the terminal portion 330 has a width similar to that of the lower portion of the body 310 to increase the stability of the transmission with the circuit board afterwards. Here, the term "bend" or "bending" refers to a specific form of curving; that is, the curving generally causes a crease or a ridge. However, curving generally refers to applying a force to change the extension direction of a material, regardless whether causing a crease or a ridge.

Figure 2B:
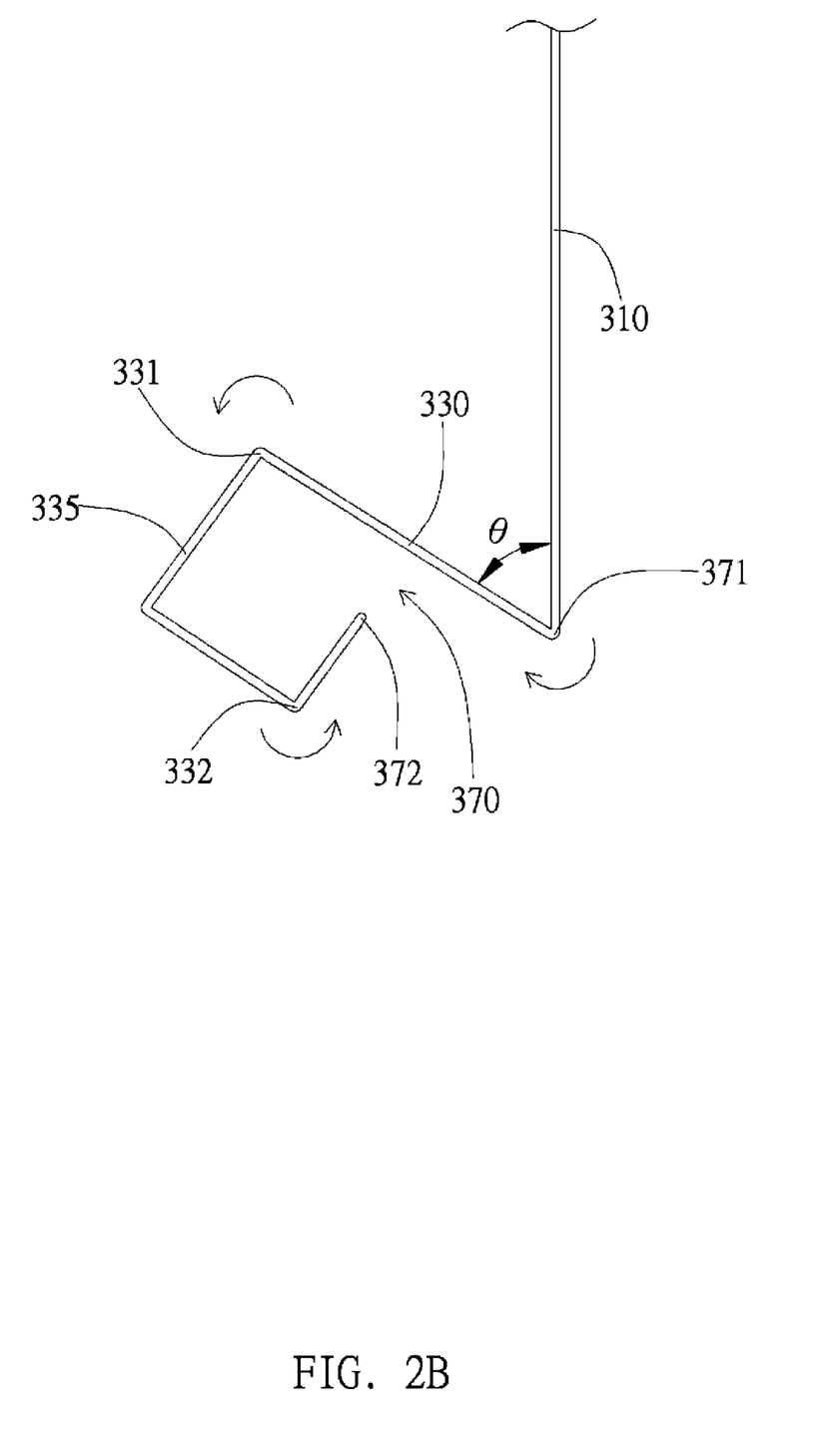
FIG. 2B is a cross-sectional view of an embodiment of a conducting structure.

After the terminal portion 330 extends out from the body 310, the terminal portion 330 is bent to form a first ridge 331; in other words, one end of the first ridge 331 is connected to the body 310. As shown in FIG. 2A and FIG. 2B, the angle included between the terminal portion 330 and the body 310 is an acute angle. In other words, the bending angle of the terminal portion 330 with respect to the body 310 is larger than 270 degrees, so that the included angle θ therebetween is reduced to less than 90 degrees. In this embodiment, the bending direction of the terminal portion 330 at the first ridge 331 is opposite to the bending direction forming the above acute angle. The so called bending direction herein refers to the rotating direction of the terminal portion 330 with respect to the first ridge 331 or the body 310 when bending the terminal portion 330. As shown in FIG. 2B, the place where the terminal portion 330 and the body 310 are connected is bent in clockwise direction, and the first ridge 331 is bent in counter clockwise direction. With such a bending manner, the connecting end 371 protruding downward and the first ridge 331 protruding upward can be formed. Due to the elasticity of the material itself and the structural relationship, the first ridge 331 can provide a supporting force. In other words, when an external force presses the first ridge 331 downward, the first ridge 331 can generate an upward elastic force from the support of the body 310 and the metal elasticity.

As shown in FIG. 2A and FIG. 2B, after the terminal portion 330 forms the first ridge 331, the terminal portion 330 turns to form a winding portion 335, which winds back toward the body 310. In other words, the winding portion 335 is connected to the other end of the first ridge 331 with respect to the body 310. As shown in FIG. 2B, the winding portion 335 extends along the direction after first ridge 331 is bent and is bent again at the middle section to wind back or forward toward the body 310. After the winding portion 335 extends toward the body 310, the terminal portion 330 is bent again to form a second ridge 332. In other words, one end of the second ridge 332 is connected to the other end of the winding portion 335, which is opposite to the first ridge 331. As shown in FIG. 2A and FIG. 2B, with such a design, the first ridge 331 and the second ridge 332 respectively protrude in different directions which can be in exact opposite directions, e.g. the direction difference is 180°.

In this embodiment, the bending direction of the second ridge 332 of the terminal portion 330 is opposite to the bending direction forming the above acute angle. The so called bending direction herein refers to the rotating direction of the bent terminal portion 330 with respect to the second ridge 332 or the body 310. As shown in FIG. 2B, the place where the terminal portion 330 is connected to the body 310 is bent clockwise, and the second ridge 332 is bent counter clockwise. With such a bending manner, the second ridge 332 protruding downward can be formed under the first ridge 331. Due to the elasticity of the material itself and structural relationship, the second ridge 332 can provide a downward force. In other words, when an external force pushes upward against the second ridge 332, the second ridge 331 can be supported by the elastic force of the winding portion 335. However, after the external force is delivered to the body 310 through the winding portion 335 and the first ridge 332, a reaction force can be provided by the body 310 to generate a reversed elastic force.

As shown in FIG. 2A and FIG. 2B, the first ridge 331, the winding portion 335, and the second ridge 332 of the terminal portion 330 together enclose an internal space, so that the terminal portion 330 forms the shape of thin tube. The thin tube is formed with an opening 370, which is axially extended. The two sides of the opening 370 are the connecting end 371 and the free end 372, respectively. The connecting end 371 is the end that the terminal portion 330 connects to the body 310, and the free end 372 is the distal end of the second ridge 332. From FIG. 2B, the cross-section of the terminal portion 330 forms a shape of 'open' polygon. Here, the term 'open' is opposite to the concept of 'closed', which means that the edges of the polygon are not completely closed. The first ridge 331 and the second ridge 332 are disposed at the most protrusive places facing upward and downward in the polygon cross-section. In the embodiment shown in FIG. 2B, because the shape of the cross-section of the terminal portion 330 is quadrilateral, the first ridge 331 and the second ridge 332 are disposed at two corresponding opposite corners of the quadrilateral.

Figure 3A:
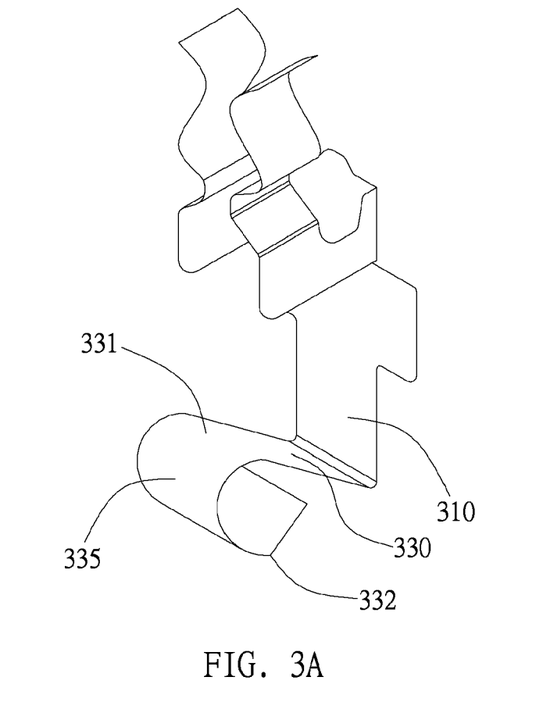
FIG. 3A and FIG. 3B illustrate another embodiment of the conducting structure.
Figure 3B:
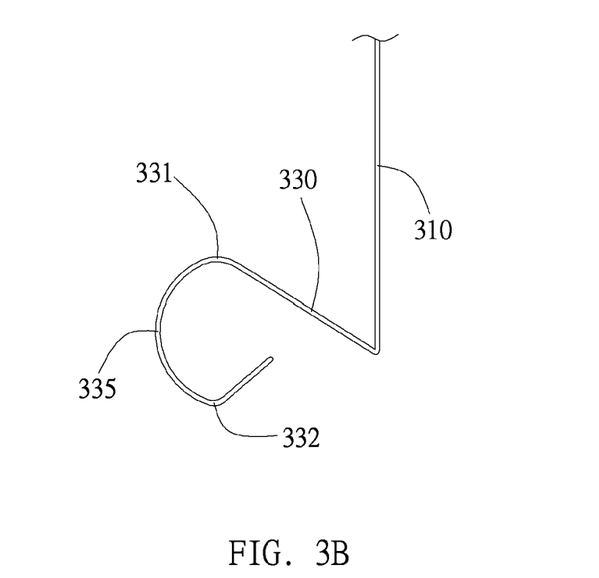
Figure 3C:
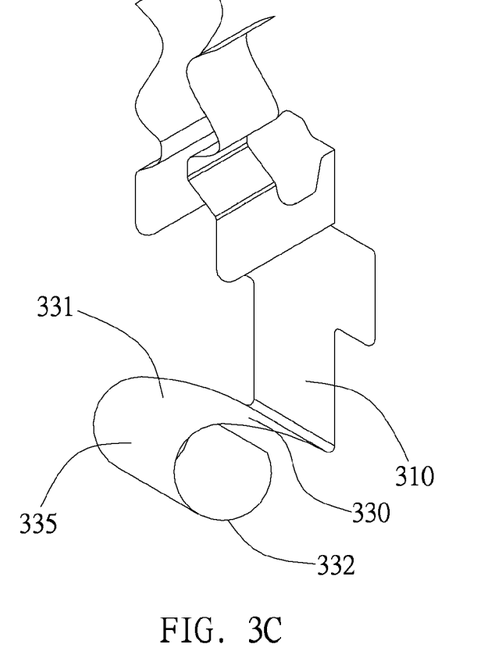
FIG. 3C and FIG. 3D illustrate another embodiment of the conducting structure.
Figure 3D:
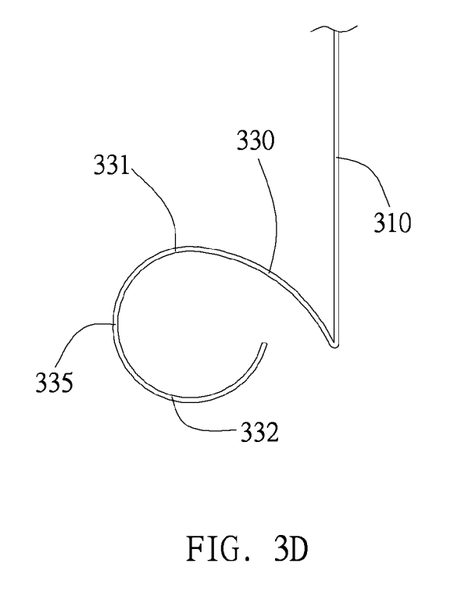

In the embodiments shown in FIG. 3A and FIG. 3B, the shape of the cross-section of the terminal portion 330 can be an open arch cross-section. The winding portion 335 forms the arc part of the arc cross-section, and the first ridge 331 and the second ridge 332 are disposed at two ends of the arc part. Therefore, the first ridge 331 and the second ridge 332 form the most protrusive portions of the arc cross-section facing upward and downward, respectively. Moreover, in the embodiment shown in FIG. 3C and FIG. 3D, the shape of the cross-section of the terminal portion 330 can be an open and approximately round shape, wherein the first ridge 331 and the second ridge 332 are close to the most protrusive portions of the approximately round cross-section and face upward and downward, respectively.

Figure 4A:
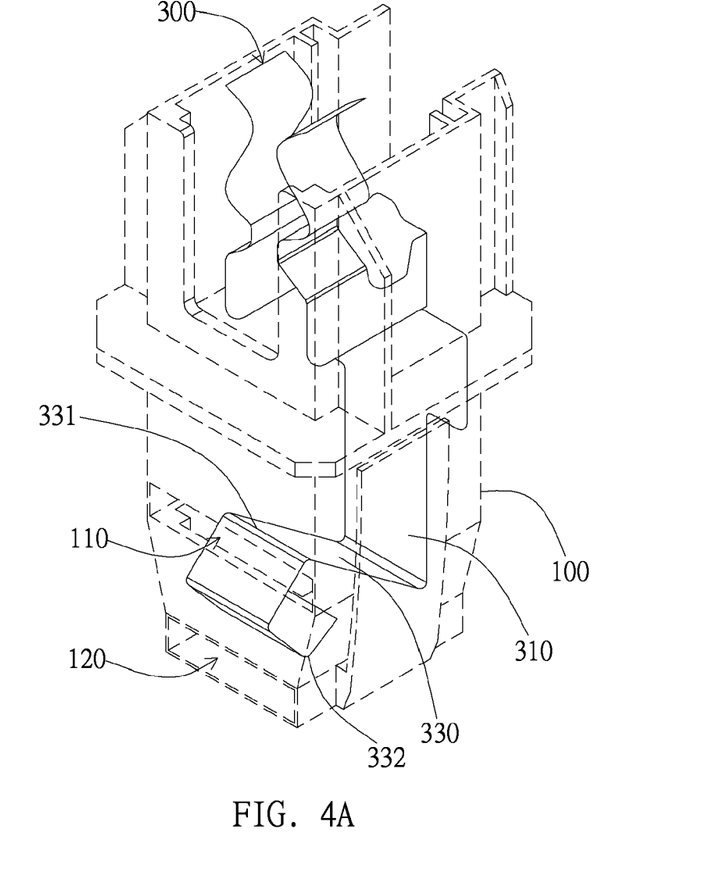
FIG. 4A is a schematic view of an embodiment showing the conducting structure disposed in the housing.
Figure 4B:
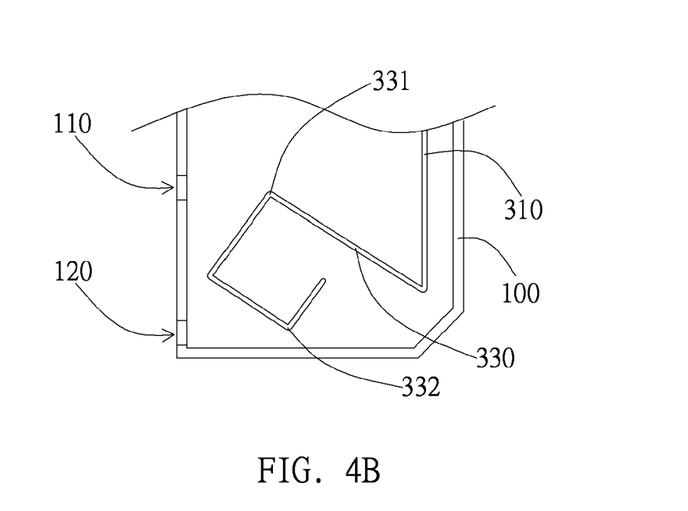
FIG. 4B is a cross-sectional view of the embodiment shown in FIG. 4A.

As shown in FIG. 4A and FIG. 4B, when the conducting structure 300 is disposed in the housing 100, the first ridge 331 and the second ridge 332 correspond to the first slot 110 and the second slot 120, respectively. As shown in FIG. 4B, the first ridge 331 and the second ridge 332 are at the same height level as the first slot 110 and the second slot 120, respectively. In a preferred embodiment, the most protrusive point of the first ridge 331 protrudes above the bottom edge of the first slot 110 and the most protrusive point of the second ridge 332 protrudes below the top edge of the second slot 120.

Figure 5A:
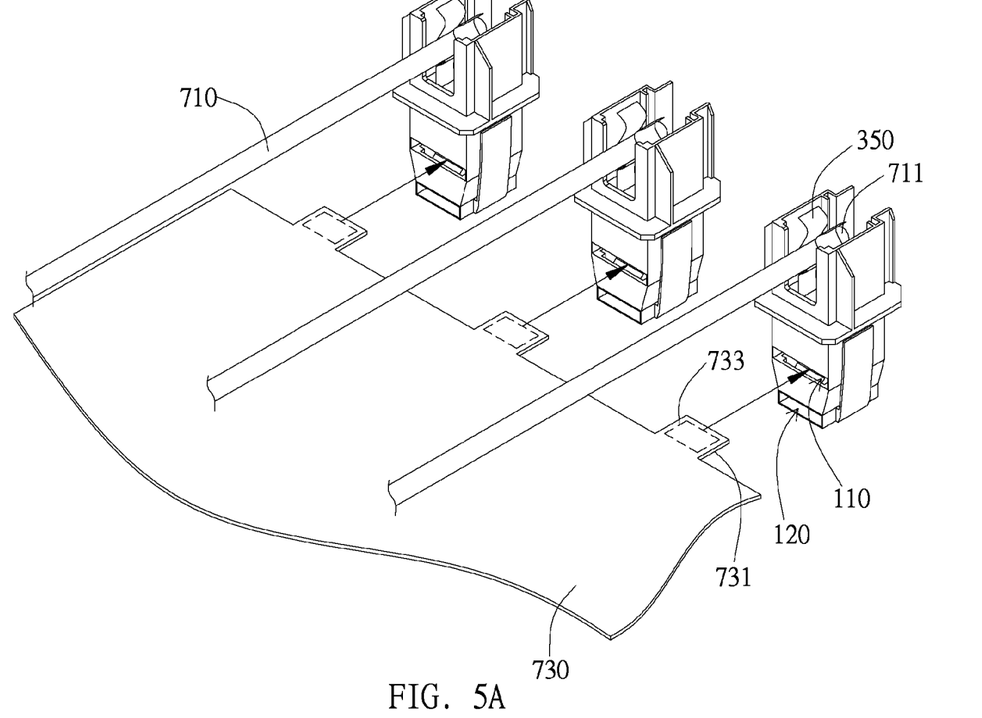
FIG. 5A is a schematic view of the embodiment showing the circuit device inserted into the first slot.
Figure 5B:
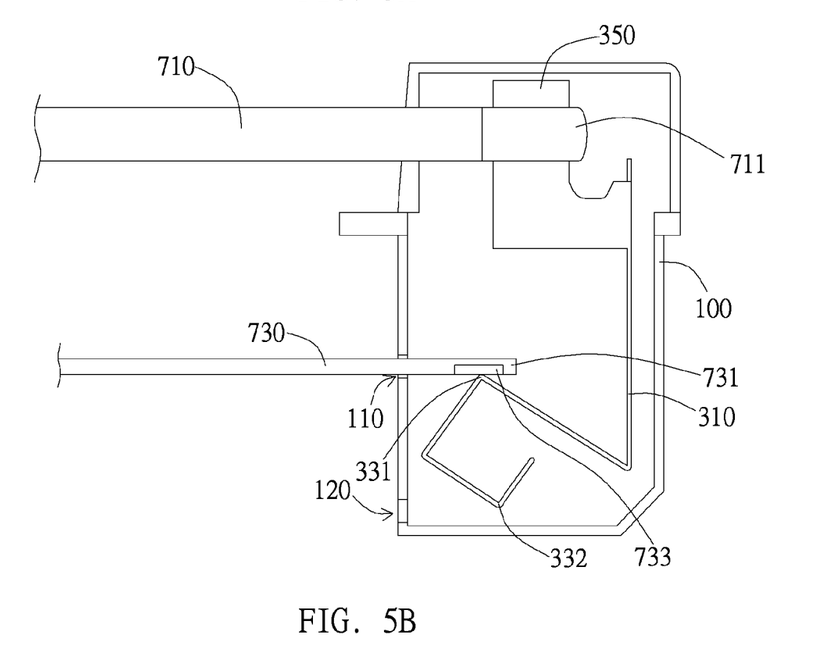
FIG. 5B is a cross-sectional view of the embodiment illustrated in FIG. 5A.

As shown in FIG. 5A and FIG. 5B, when the multi-slot connector is employed in the backlight module, the electrode end 711 of the light tube 710 is clipped in the light tube clip end 350, and the insertion end 731 of the circuit device 730 is inserted into the first slot 110. The circuit device 730 can include inverters, LCD integrated power supply (LIPS) or other circuit module, which can be a surface mounted technology (SMT) printed circuit board. The bottom surface of the insertion end 731 of the circuit device 730 is formed with a conducting pad 733, which can press the first ridge 331 downward and couple thereto.

Figure 6A:
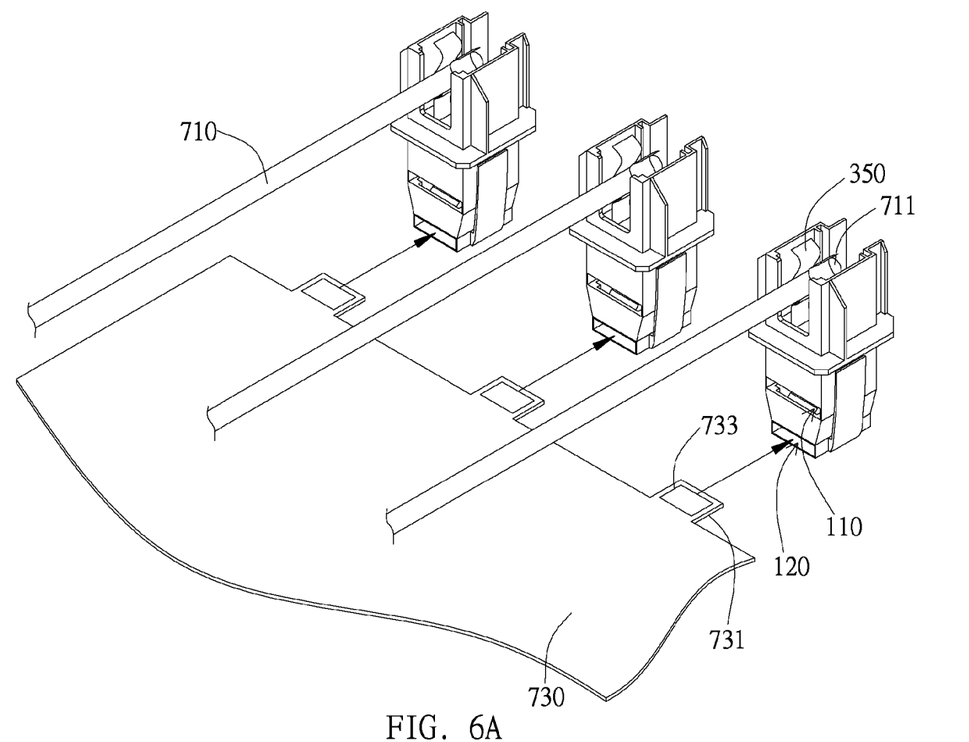
FIG. 6A is a schematic view of the embodiment showing the circuit device inserted into the second slot.
Figure 6B:
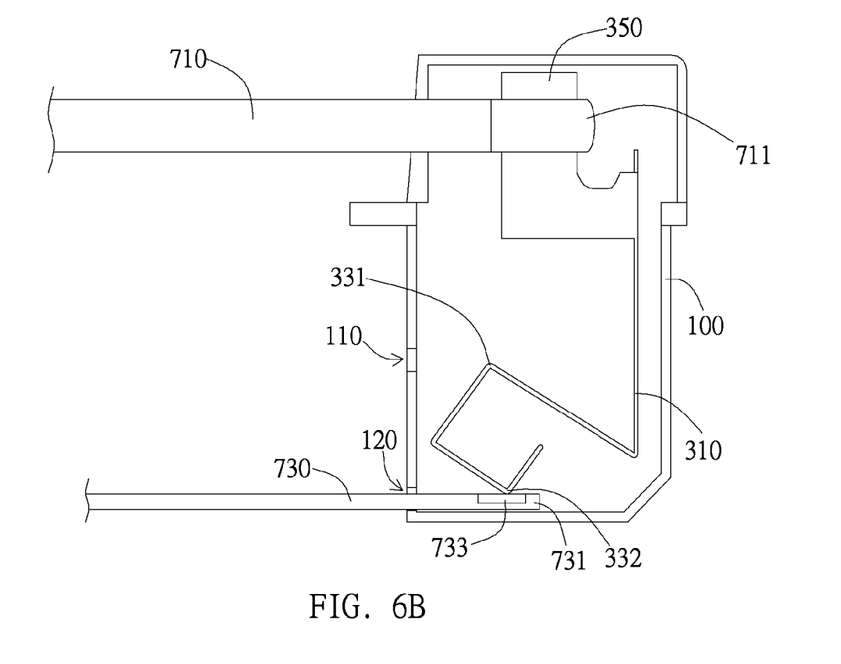
FIG. 6B is a cross-sectional view of the embodiment illustrated in FIG. 6A.
Figure 7:
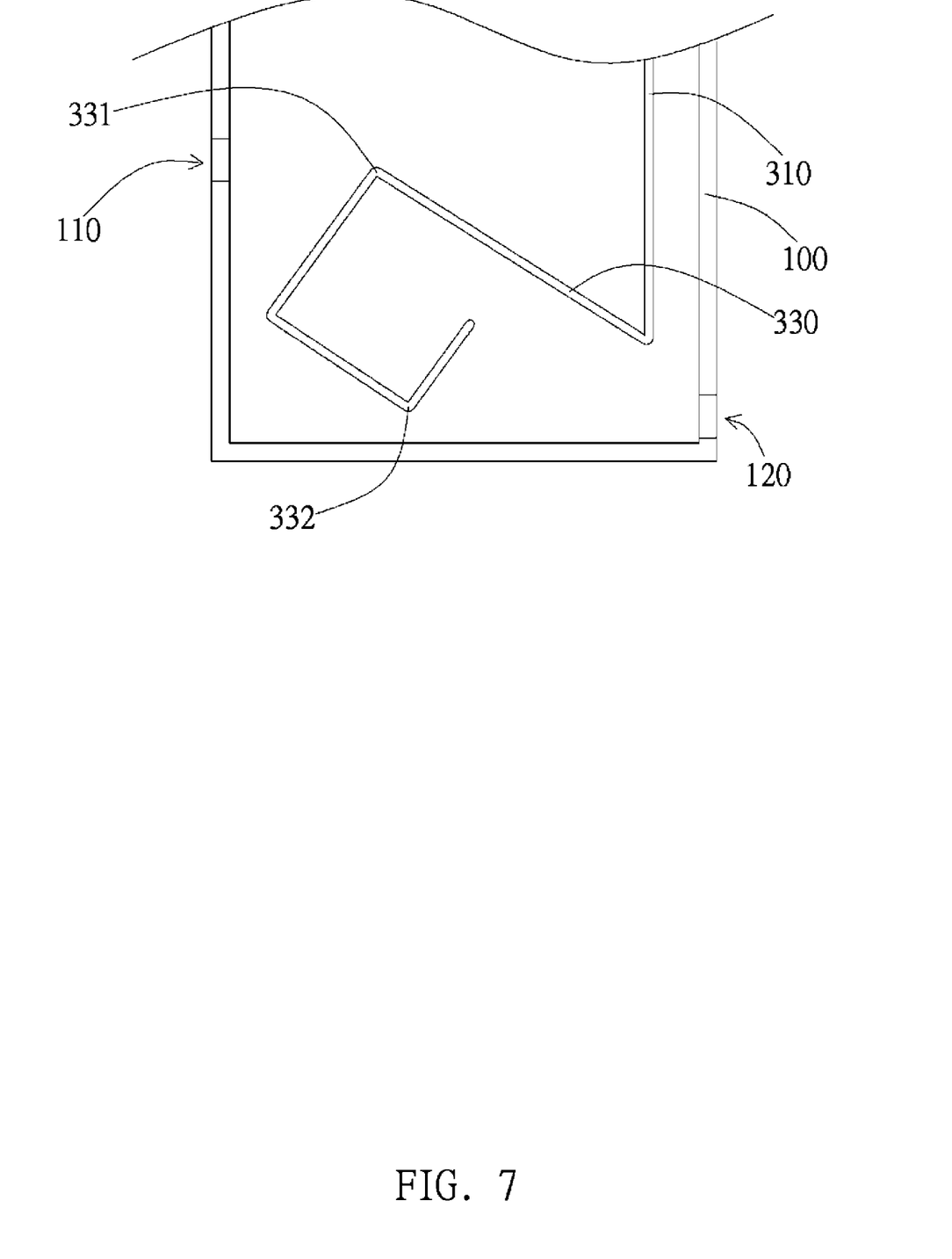
FIG. 7 is a schematic view of an embodiment showing that the first slot and the second slot are disposed in opposite directions.

In the embodiments shown in FIG. 6A and FIG. 6B, the circuit device 730, which can be a dual in-line package (DIP) printed circuit board, can be inserted into the second slot 120 to couple the second ridge 332. Moreover, if necessary, in designing the circuit, the first slot 110 and the second slot 120 can be inserted with circuit devices 730 at the same time to provide a connection of signals. With such a design, the variety of design and arrangement of circuit design can be increased. Moreover, in the embodiment shown in FIG. 7, the first slot 110 and the second slot 120 are formed on opposite sides of the housing 100, respectively. That is, the first slot 110 and the second slot face opposite directions, respectively. In other words, different circuit devices 730 can be inserted into the first slot 110 and the second slot 120 from different directions to increase the convenience of designing mechanism.

Figure 8A:
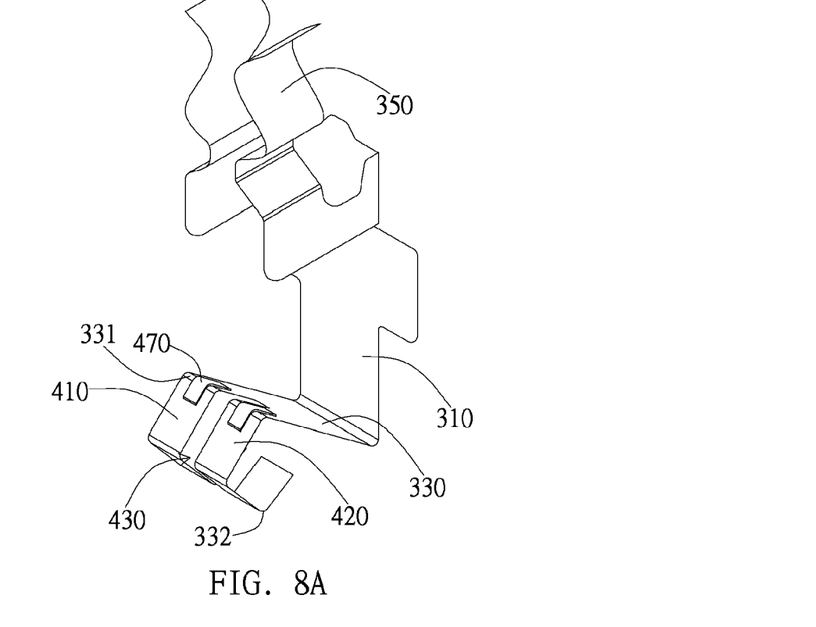
FIG. 8A is a schematic view of the embodiment showing that the terminal portion is divided into a first terminal and a second terminal.

In the embodiment shown in FIG. 8A, the terminal portion 330 includes a first terminal 410 and a second terminal 420, wherein the first terminal 410 and the second terminal 420 can be formed by cutting the terminal portion 330. As shown in FIG. 8A, the first terminal 410 and the second terminal 420 are disposed in parallel and connected to the body 100. The first terminal 410 and the second terminal 420 can have cross-sections with the same shape and size and both have the first ridge 331 and the second ridge 332 formed by bending. Moreover, a plurality of salient points 470 can be formed thereon to increase the coupling efficiency with circuit devices. Moreover, the portion between the first terminal 410 and the second terminal 420 is cut to form a gap 430 for separation. As shown in FIG. 8A, the first terminal 410 and the second terminal 420 are respectively bent to form an open ring structures, which can serve as a first conducting ring and a second ring. The first conducting ring and the second conducting ring are coaxially arranged side by side, and respectively connected to the body 310. With such a design, the contact between the circuit device and the terminal portion 330 can be ensured even when being pushed by external forces from different directions.

Figure 8B:
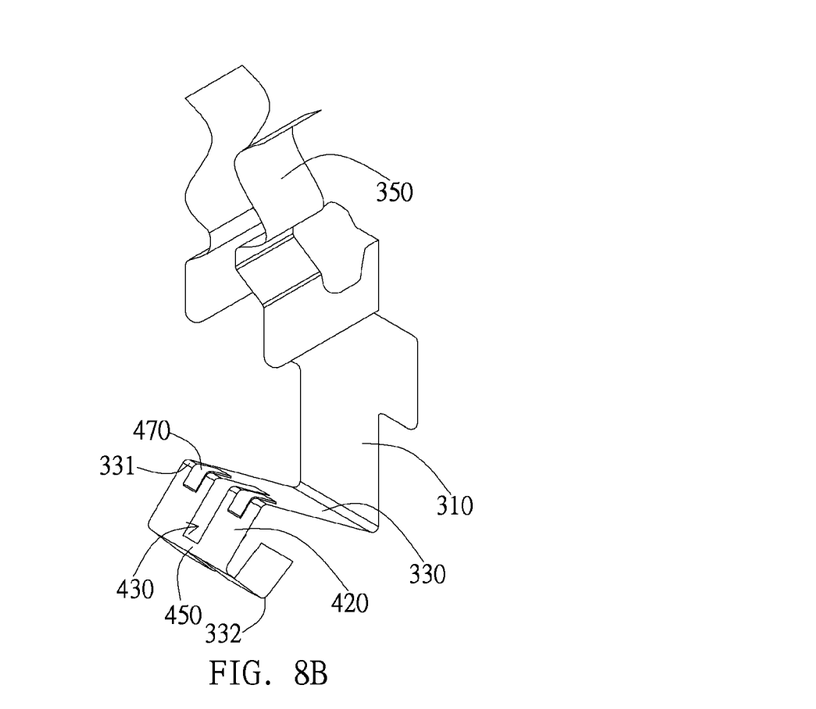
FIG. 8B is a schematic view of an embodiment showing that the terminal portion includes a bridging portion.

In the embodiment shown in FIG. 8B, the terminal portion 330 further includes a bridging part 450 connecting the first terminal 410 and the second terminal 420. As shown in FIG. 8B, the bridging part 450 can be disposed between the first ridge 331 and the second ridge 332, that is where the winding portion 335 is. In a preferred embodiment, the bridging portion 450 is formed as the metal sheet is cut to form the terminal portion 330. When cutting, the middle portion of the upper section and the middle portion of the lower section of the terminal portion 330 are cut into strip gaps to form the gap 430 between the first terminal 410 and the second terminal 430 and to leave the middle section between the upper section and the lower section uncut to form the bridging part 450. With such a design, the structure strength of the terminal portion 330 can be enhanced. Moreover, as shown in FIGS. 8A and 8B, a plurality of salient points 470 can be formed on the first ridge 331 and the second ridge 332 to increase the coupling efficiency with the circuit device.

Figure 9A:
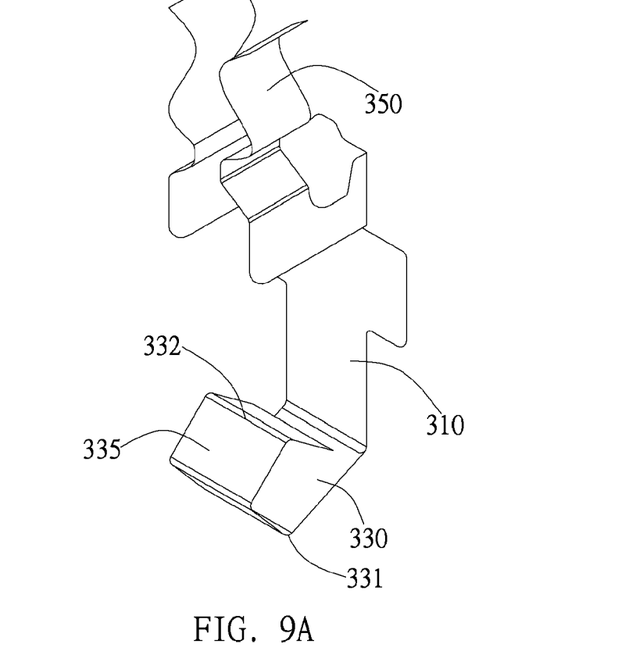
FIG. 9A is a schematic view of another embodiment of the conducting structure.
Figure 9B:
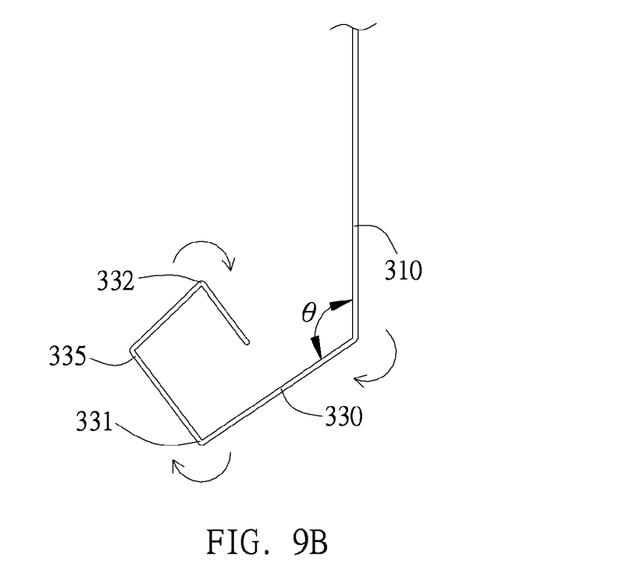
FIG. 9B is a cross-sectional view of the embodiment shown in FIG. 9A.

FIG. 9A and FIG. 9B illustrate another embodiment of the conducting structure 300. As shown in FIG. 9A and FIG. 9B, the included angle θ at the bent part of the terminal portion 330 and the body 310 is an obtuse angle. In other words, the bending angle of the terminal portion 330 with respect to the body 310 is less than 270 degrees, so that the included angle θ therebetween is more than 90 degrees. In this embodiment, the bending direction of the terminal portion 330 at the first ridge 331 is the same as the bending direction forming the above obtuse angle. The so called bending direction herein refers to the rotating direction of the terminal portion 330 when the terminal portion 330 is bent with respect to the first ridge 331 or the body 310. As shown in FIG. 9B, the place where the terminal portion 330 and the body 310 are connected is bent clockwise, and at the first ridge 331 is also bent clockwise. In this manner, the first ridge 331 protruding downward can be formed and due to the elasticity of the material itself and the structural relationship, the first ridge 331 can generate a downward force. In other words, when the external force pushes the first ridge 331 upward, the first ridge 331 can generate the downward elastic force from the support of the body 310 and the metal elasticity.

As shown in FIG. 9A and FIG. 9B, after the terminal portion 330 forms the first ridge 331, the terminal portion 330 is bent to form a winding portion 335, which winds back toward the body 310. As shown in FIG. 9B, the winding portion 335 extends along the direction after the first ridge 331 is bent and is bent again at the middle section to wind back or forward toward the body 310. After the winding portion 335 extends toward the body 310, the terminal portion 330 is bent again to form a second ridge 332, so that the first ridge 331 and the second ridge 332 protrude in different directions. In this embodiment, the bending direction of the terminal portion 330 at the second ridge 332 is the same as the bending direction forming the above obtuse angle. As shown in FIG. 9B, the place where the terminal portion 330 and the body 310 are connected is bent clockwise, and at the second ridge 332 is also bent clockwise. With such a bending manner, the second ridge 331 protruding upward can be formed above the first ridge 331 and due to the elasticity of the material itself and the structural relationship, an upward force can be provided.

Figure 10:
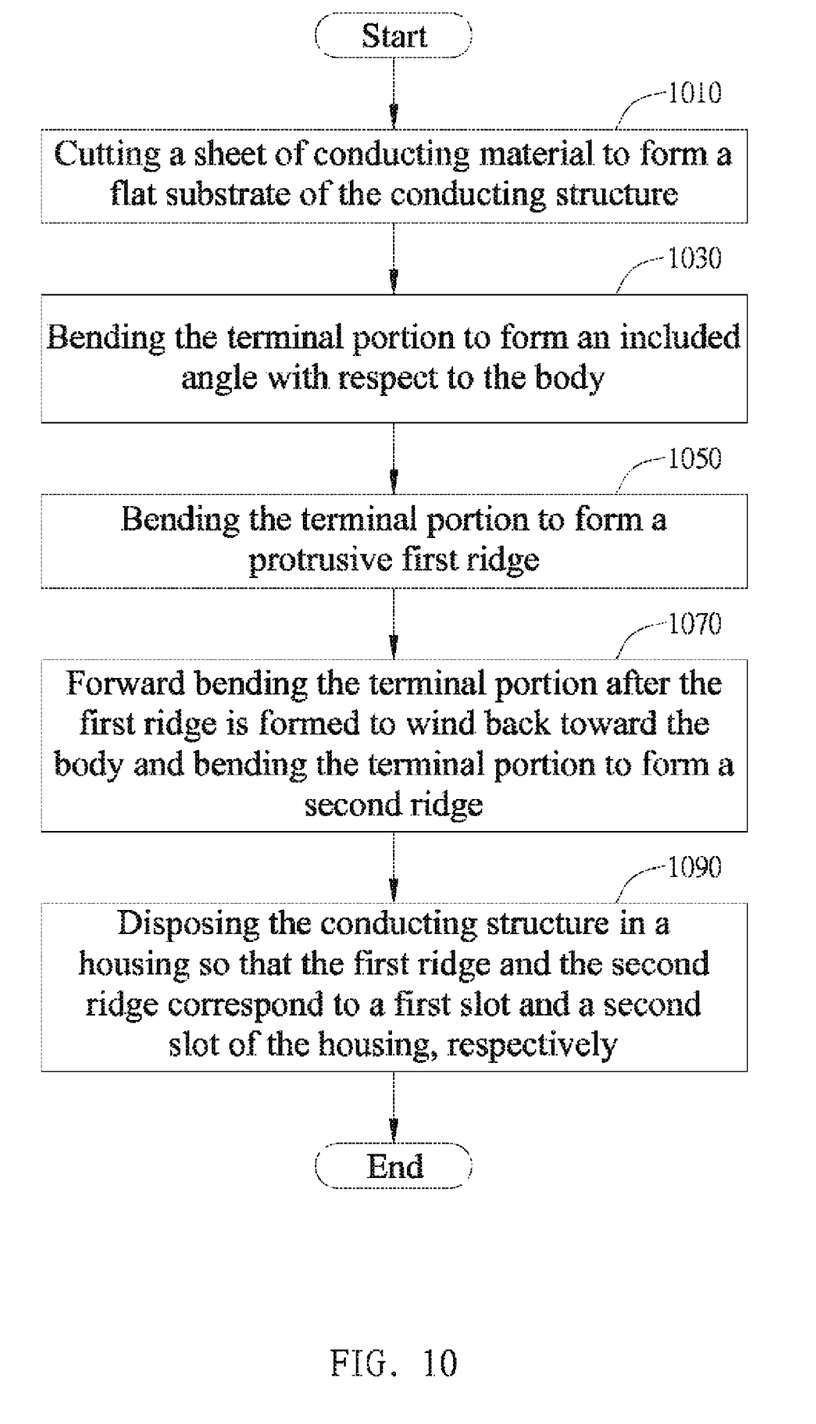
FIG. 10 is a flow chart of the embodiment of a manufacture method of the multi-slot connector of this invention.

FIG. 10 is a flow chart of an embodiment of a manufacture method of the multi-slot connector of this invention. Step 1010 includes cutting a sheet of conducting material to form a flat substrate of the conducting structure, wherein the flat substrate includes a body and a terminal portion. The conducting material can be a conductive metal sheet, such as a copper sheet. In this step, the cutting of the flat substrate can be implemented through punching; however, in another embodiment, the cutting can be implemented by other methods.

Step 1030 includes bending the terminal portion to form an included angle with respect to the body. The included angle can be an acute angle or an obtuse angle. Step 1050 includes bending the terminal portion to form a protrusive first ridge. In this step, the direction of bending the terminal portion can be the same as or opposite to the bending direction forming the included angle between the terminal portion and the body. The bending direction herein refers to the rotating direction of the terminal portion with respect to the first ridge or the body when bent. When the included angle is an acute angle, in this step, the terminal portion can be bent backward to form the first ridge; when the included angle is an obtuse angle, in this step, the terminal portion can be bent forward to form the first ridge.

Step 1070 includes forward bending the terminal portion after the first ridge is formed to wind back or forward toward the body. The so called forward bending refers to that the bending direction of this part is the same as the bending direction of the first ridge. Moreover, this step further includes bending the terminal portion to form a protrusive second ridge, and the bending direction of the second ridge is also the same as the bending direction of the first ridge.

Step 1090 includes disposing the conducting structure in a housing so that the first ridge and the second ridge corresponding to a first slot and a second slot of the housing, respectively. In one embodiment, the first ridge and the second ridge are at the same height level as the first slot and the second slot. In another embodiment, the most protrusive point of the first ridge can protrude above the bottom edge of the first slot; the most protrusive point of the second ridge can protrude under the top edge of the second slot.

This invention has been described with the related embodiments; however, the embodiments above are only exemplary. What needs to point out is that the disclosed embodiments are not intended to limit the scope of this invention. Contrarily, the modifications and equivalents included in the spirit and scope of this invention are all included in the scope of the claims.

What is claimed is:

1. A multi-slot connector, comprising:
   a housing including a first slot and a second slot; and
   a conducting structure disposed in the housing, including:
   a body;
   a terminal portion, the terminal portion forming a thin tube and an opening axially extending thereon and having a connecting end and a free end on both sides of the opening, wherein the connecting end is connected to the body; and
   a light tube clip end connected to the other end of the body opposite to the terminal portion;
   wherein the thin tube forms a first ridge and a second ridge extending axially to protrude toward different directions and correspond to the first slot and the second slot, respectively.

2. The multi-slot connector of claim 1, wherein the thin tube includes a first conducting ring and a second conducting ring disposed side by side and respectively connected to the body, and a gap is formed between the first conducting ring and the second conducting ring.

3. The multi-slot connector of claim 2, wherein the terminal portion includes a bridging part connecting the first conducting ring and the second conducting ring between the first ridge and the second ridge.

* * * * *